Sept. 18, 1923.
L. W. TIBYRICA
FASTENER
Filed March 5, 1921
1,468,052
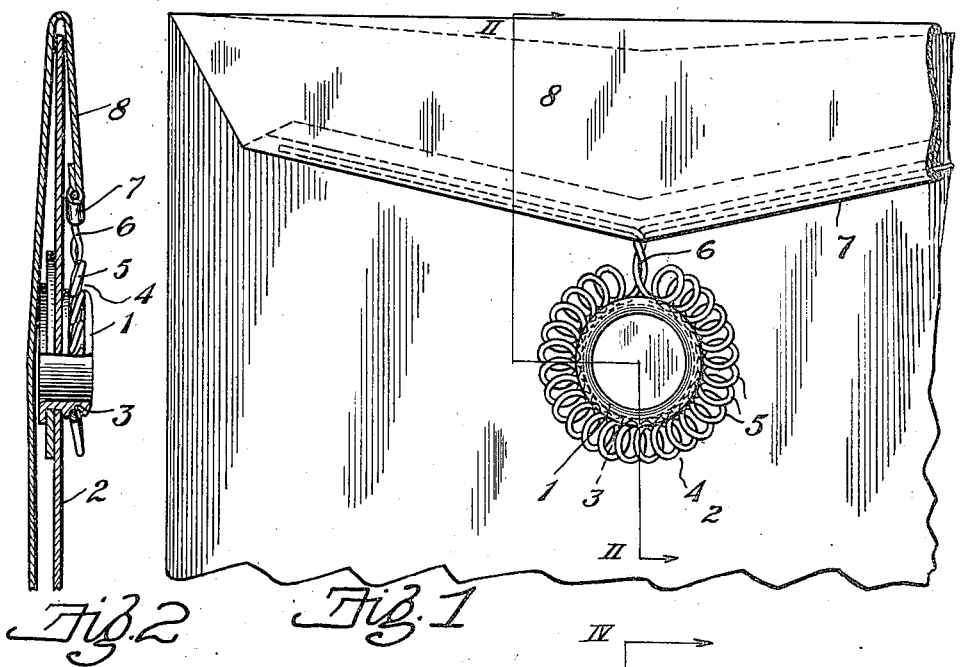
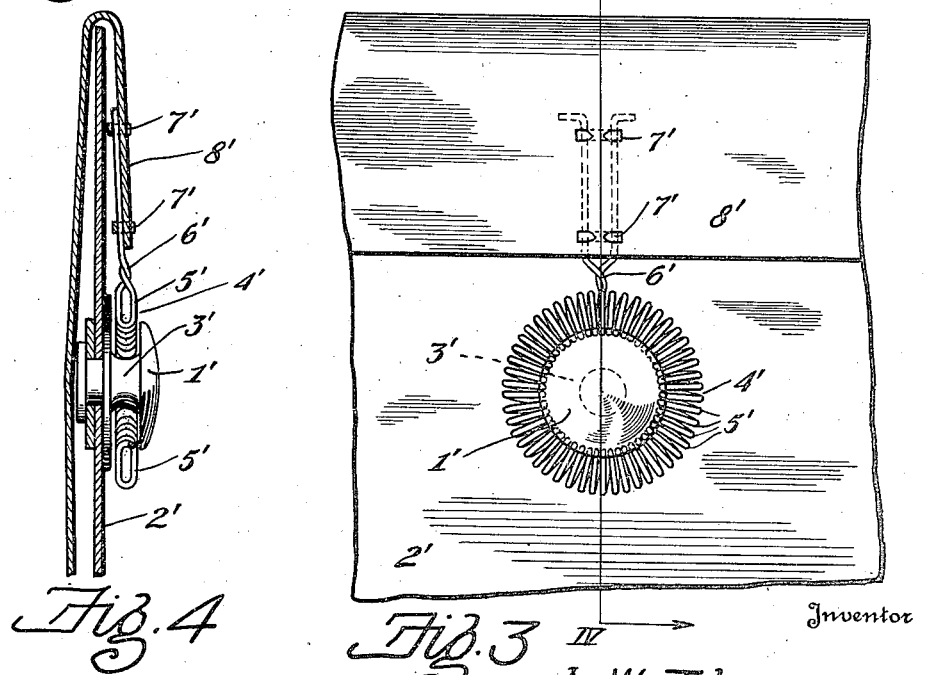
Inventor
L. W. Tibyrica
By Frease, Merkel, Saywell and Bond
Attorneys Patented Sept. 18, 1923.

1,468,052

UNITED STATES PATENT OFFICE.

LUIZ W. TIBYRICA, OF SAO PAULO, BRAZIL.

FASTENER.

Application filed March 5, 1921. Serial No. 449,824.

*To all whom it may concern:*

Be it known that I, LUIZ WHITTLESEY TIBYRICA, a citizen of Brazil, residing at Sao Paulo, Brazil, have invented a new and useful Fastener, of which the following is a specification.

The invention relates to fasteners for the overlapping leaves or layers of envelopes, boxes, garments and similar articles wherein one member is folded over or abutted against an adjacent member for being temporarily connected therewith; and the object of the invention is to provide a fastener comprising two separable parts secured to the overlapping or abutting members respectively and adapted to be easily and readily connected or disconnected without liability of an accidental disengagement, constructed for giving a maximum holding capacity with a minimum thickness or depth, so that the flap of an envelope or the like, will be securely connected with the overlapped side thereof, without increasing the thickness of the envelope in an objectionable manner.

These objects may be attained by securing a peripherally grooved eye or post head to one of the members to be connected together, and by securing an annulet made of a flattened helical coil of spring wire to the other member, so proportioned that the annulet must be sprung over the head or eye for engagement around the peripheral groove thereof.

Such an embodiment of the invention is illustrated in two different forms in the accompanying drawings, forming part hereof, in which—

Figure 1 is a fragmentary side elevation of an envelope showing an improved fastener with a coiled annulet having torsionally flattened convolutions;

Fig. 2, a section of same on line II—II, Fig. 1;

Fig. 3, a fragmentary side elevation of an envelope showing an improved fastener with a coiled annulet having the convolutions flattened by bending; and Fig. 4, a section of the same on line IV—IV, Fig. 3.

Similar numerals refer to similar parts throughout the drawings.

Referring first to Figs. 1 and 2, one fastening part may be in the form of an eye-head 1 secured to the side 2 of an envelope and having an annular groove 3 in its periphery on the outer side of the envelope; and the other fastening part may be in the form of an annulet 4 composed of a helical spring having its convolutions 5 torsionally flattened in a plane perpendicular to the axis of the annulet by deflecting them sidewise one upon another as shown quite clearly in Fig. 2, the wires of the coil being twisted together as at 6, thence diverging in opposite directions and secured to the edge 7 of the flap 8 of the envelope.

The annulet thus formed is adapted to be sprung over the outer side of the eye-head for engagement in and disengagement from the peripheral groove thereof, and the torsional flattening of the convolutions not only reduces the depth or thickness of the annulet, but increases its holding capacity as compared with an ordinary helical coil.

This form of the improvement is preferred for the smaller fasteners, it being evident that a very small helical coil made of comparatively fine spring wire can be used, and that the thickness of the annulet does not exceed twice the thickness of the wire, thus reducing to a minimum, the weight and thickness of this member of the fastener.

Referring to the different form of the invention shown in Figs. 3 and 4, one fastening part may be in the form of a post-head 1' secured to the side 2' of an envelope and having an annular groove 3' in its periphery on the outer side of the envelope; and the other fastening part may be in the form of an annulet 4' composed of a helical spring having its convolutions 5' flattened by a bending upon themselves of the inner and outer curves and a flattening of the side curves in a plane perpendicular to the axis of the annulet so as to give each convolution the form of a flattened radial oval as well as appears in section in Fig. 4, the wires of the coil being twisted together as at 6', thence extending and being secured by suitable clips 7' to the flap 8' of the envelope.

The annulet thus formed is likewise adapt to be sprung over the outer end of the post-head for engagement in and disengagement from the peripheral groove thereof, and the bending of the convolutions to flatten the same, not only reduces the depth or thickness of the annulet, but materially increases its holding capacity as compared with an ordinary helical coil.

This form of the improvement is preferred for the larger fasteners, it being evident that quite large helical coils made of heavy spring wire can be used, and that the thickness of the annulet need not exceed three times the thickness of the wire, and that its compressing action being substantially along radial lines, is increased to a maximum.

I claim:—

1. A fastener for two separable members comprising a head on one member and an annulet on the other member composed of spring wire helically coiled and flattened in a plane perpendicular to the axis of the annulet for engagement with the head.

2. A fastener for two separable members comprising a head having a peripheral groove on one member and an annulet on the other member composed of spring wire helically coiled and flattened in a plane perpendicular to the axis of the annulet for engagement in the groove of the head.

3. A fastener for two separable members comprising a head on one member and an annulet on the other member composed of spring wire helically coiled and flattened in a plane perpendicular to the axis of the annulet by bending upon itself to form flattened oval convolutions for engagement with the head.

In testimony that I claim the above, I have hereunto subscribed my name.

LUIZ W. TIBYRICA.